US010672177B2

(12) United States Patent
Iwaniec et al.

(10) Patent No.: US 10,672,177 B2
(45) Date of Patent: Jun. 2, 2020

(54) USING DIRECTIONAL IRRADIANCE DATA FOR SELECTING THE DISTRIBUTION OF SAMPLING RAYS IN A FINAL GATHER STEP IN GRAPHICS PROCESSING

(71) Applicant: GEOMERICS LTD, Cambridge (GB)

(72) Inventors: Michel Patrick Gabriel Emil Iwaniec, Cambridge (GB); Matthew James Bentham, Willingham (GB); Roland Kuck, Ely (GB); Derek Andrew Lamberti, Hardwick (GB)

(73) Assignee: Arm Limiteed, Cambridge (GB)

( * ) Notice: Subject to any disclaimer, the term of this patent is extended or adjusted under 35 U.S.C. 154(b) by 0 days.

(21) Appl. No.: 15/296,416

(22) Filed: Oct. 18, 2016

(65) Prior Publication Data

US 2017/0116773 A1    Apr. 27, 2017

(30) Foreign Application Priority Data

Oct. 23, 2015  (GB) .................................. 1518774.3

(51) Int. Cl.
| | |
|---|---|
| *G06T 15/06* | (2011.01) |
| *G06T 15/04* | (2011.01) |
| *G06T 15/80* | (2011.01) |
| *G06T 15/55* | (2011.01) |

(52) U.S. Cl.
CPC .............. *G06T 15/06* (2013.01); *G06T 15/04* (2013.01); *G06T 15/55* (2013.01); *G06T 15/80* (2013.01)

(58) Field of Classification Search
CPC ....... G06T 15/06; G06T 15/506; G06T 15/08; G06T 15/55; G06T 15/50; G06T 15/60
See application file for complete search history.

(56) References Cited

U.S. PATENT DOCUMENTS

| | | | |
|---|---|---|---|
| 7,675,518 B1* | 3/2010 | Miller ..................... | G06T 15/06 345/426 |
| 2004/0001062 A1* | 1/2004 | Pharr ..................... | G06T 15/55 345/426 |

(Continued)

FOREIGN PATENT DOCUMENTS

EP    2674917    12/2013

OTHER PUBLICATIONS

Combined Search and Examination Report dated Mar. 17, 2016, GB Patent Application GB1518774.3.

(Continued)

*Primary Examiner* — Jeffrey J Chow
(74) *Attorney, Agent, or Firm* — Vierra Magen Marcus LLP (57) ABSTRACT

A graphics processing system performs a final gather process so as to generate final gather lighting data for a scene. The final gather process comprises casting sampling rays from a final gather point within the scene. Radiosity data provided for the scene is sampled using the sampling rays cast from the final gather point. Final gather lighting data is then generated from the sampled radiosity data. The sampling rays are cast from the final gather point in an informed manner based on directional irradiance data provided for the scene. The final gather process can therefore be carried out by the graphics processing system more efficiently and effectively.

17 Claims, 4 Drawing Sheets

(56) References Cited

U.S. PATENT DOCUMENTS

| | | | | |
|---|---|---|---|---|
| 2007/0018996 A1* | 1/2007 | Wang | ............... | G06T 15/50 |
| | | | | 345/592 |
| 2013/0002671 A1 | 1/2013 | Armsden et al. | | |
| 2013/0120385 A1* | 5/2013 | Krishnaswamy | ....... | G06T 15/50 |
| | | | | 345/426 |
| 2013/0335434 A1* | 12/2013 | Wang | ............ | G06T 15/506 |
| | | | | 345/581 |
| 2014/0327690 A1* | 11/2014 | McGuire | ......... | A63F 13/355 |
| | | | | 345/589 |
| 2015/0042651 A1* | 2/2015 | Dwyer | ............ | G06T 15/06 |
| | | | | 345/426 |
| 2015/0042655 A1* | 2/2015 | Gautron | ......... | G06T 15/60 |
| | | | | 345/426 |
| 2015/0371435 A1* | 12/2015 | Zhu | ................. | G06T 15/60 |
| | | | | 345/426 |
| 2016/0005217 A1* | 1/2016 | Tokuyoshi | ...... | G06T 15/506 |
| | | | | 345/426 |
| 2016/0171754 A1* | 6/2016 | Ahn | ................. | G06T 15/506 |
| | | | | 345/426 |
| 2016/0292913 A1* | 10/2016 | Wahrenberg | ..... | G06T 15/506 |

OTHER PUBLICATIONS

GB Examination Report dated Jan. 21, 2019, GB Patent Application GB1518774.3.

\* cited by examiner

USING DIRECTIONAL IRRADIANCE DATA FOR SELECTING THE DISTRIBUTION OF SAMPLING RAYS IN A FINAL GATHER STEP IN GRAPHICS PROCESSING

BACKGROUND

The technology described herein relates to graphics processing and in particular to the operation of a graphics processing system that performs a final gather process so as to generate final gather lighting data for a scene to be rendered.

It is common in graphics processing systems to render surfaces for display by sub-dividing each surface into a number of similar basic components called "primitives" to allow the graphics processing operations to be more easily carried out. These primitives are usually in the form of simple polygons, such as triangles. Each primitive is usually defined by and represented as a set of vertices. Each vertex for a primitive typically has associated with it a set of vertex attribute data (such as position, colour, transparency, texture coordinate, etc.) indicating the properties of the primitive at that vertex. This vertex attribute data may be used, for example, when rasterising and rendering the primitives in order to generate the desired output of the graphics processing system.

It is often desirable to apply lighting effects to enhance the atmosphere and/or realism of a scene that contains surfaces to be rendered. One common approach for applying lighting effects uses a "photon ray tracing" process to generate radiosity data for the surfaces within the scene (i.e. to generate data that represents the intensity of light transmitted through, emitted from, reflected by, etc., the surfaces within the scene). The photon ray tracing process typically comprises casting a plurality of photon rays from each light source that is being used to light the scene towards the surfaces within the scene. The radiosity at points on the surfaces that are intersected by the rays is calculated and the calculated radiosity is stored as radiosity data in a "light map" for the surfaces of the scene. The light map can then be used when rendering the surfaces of the scene. For example, the radiosity data in the light map may be used as a lighting texture when rendering the primitives that represent the surfaces of the scene.

When performing photon ray tracing, further "recursive" photon rays may be cast from surfaces within the scene towards other surfaces within the scene. This can provide indirect lighting effects that replicate first, and possibly subsequent, light bounces. This can improve the atmosphere and/or realism of the lighting effects. However, casting a sufficient number of recursive photon rays can be computationally expensive. On the other hand, casting no recursive photon rays or an insufficient number of recursive photon rays can lead to undesirably and/or unrealistically dull or dark areas in the scene.

To improve the atmosphere and/or realism of lighting effects, a "final gather" process may be carried out. The final gather process typically comprises casting a plurality of sampling rays in all directions away from "final gather points" for surfaces within the scene towards other surfaces and/or light sources for the scene. The sampling rays sample radiosity data for the other surfaces and/or light sources at the points at which those sampling rays meet the other surfaces and/or light sources. The sampled radiosity data for the final gather points is then combined to generate final gather lighting data for the scene. The final gather lighting data can then be used when rendering the scene. For example, the final gather lighting data may be used to create a lighting texture, which may then be used when rendering the primitives that represent the surfaces of the scene.

The direction in which the sampling rays are cast (i.e. away from the points for which lighting data is being generated) means that there is no need to cast recursive rays in order to create indirect lighting effects when performing the final gather process. Thus, the final gather process can lead to enhanced atmosphere and/or realism for the scene being lit whilst also being relatively less computationally expensive than equivalent photon ray tracing processes.

In order to be particularly effective, the final gather process usually still requires a large number of sampling rays to be cast in all directions from a large number of final gather points. This can place a large processing burden on the graphics processing system. It may of course be possible to reduce the number of sampling rays and/or final gather points so as to reduce the amount of processing needed, but this will inevitably reduce the quality of the final gather lighting data being generated.

The Applicants accordingly believe that there remains scope for improvements to the operation of graphics processing systems that perform a final gather process.

BRIEF DESCRIPTION OF THE DRAWINGS

Embodiments of the technology described herein will now be described by way of example only and with reference to the accompanying drawings, in which.

Like reference numerals are used for like components where appropriate in the drawings.

DETAILED DESCRIPTION

An embodiment of the technology described herein comprises a method of operating a graphics processing system comprising:

performing a final gather process so as to generate final gather lighting data for a scene to be rendered, the final gather process comprising:

casting sampling rays from one or more final gather points within the scene, wherein the distribution of the sampling rays cast from the one or more final gather points is based on directional irradiance data provided for the scene;

sampling radiosity data provided for the scene using the sampling rays cast from the one or more final gather points; and     generating the final gather lighting data from the sampled radiosity data.

Another embodiment of the technology described herein comprises a graphics processing system comprising:

processing circuitry configured to perform a final gather process so as to generate final gather lighting data for a scene to be rendered, the processing circuitry being configured to:

cast sampling rays from one or more final gather points within the scene, wherein the distribution of the sampling rays cast from the one or more final gather points is based on directional irradiance data provided for the scene;

sample radiosity data provided for the scene using the sampling rays cast from the one or more final gather points; and generate the final gather lighting data from the sampled radiosity data.

In the technology described herein, radiosity data provided for a scene to be rendered is sampled during a final gather process, e.g. in a conventional manner, so as to generate final gather lighting data. However, in the technology described herein, directional irradiance data is used during the final gather process as a basis for deciding and/or selecting how the sampling rays of the final gather process should be distributed. The technology described herein accordingly provides a graphics processing system that allows the sampling rays for one or more final gather points to be distributed in an informed manner based on the direction of irradiance. For example, relatively more sampling rays may be cast in particular directions, e.g. if or when the directional irradiance data indicates that those particular directions are likely to provide a relatively greater amount of irradiance. Alternatively, relatively fewer or no sampling rays may be cast towards other particular directions, e.g. if or when the directional irradiance data indicates that those other particular directions are likely to provide a relatively lesser amount of irradiance. The technology described herein can therefore provide a higher quality set of final gather lighting data, for example having lower variance, by selecting a more appropriate distribution of sampling rays based on the direction of irradiance. Furthermore, since casting sampling rays can be computationally expensive, the technology described herein provides a graphics processing system that allows a final gather process to be performed in a more computationally efficiently manner, for example by using fewer, but more appropriately distributed, sampling rays.

As discussed above, the technology described herein makes use of radiosity data provided for the scene. This radiosity data may comprise radiosity data provided in respect of one or more surface regions within the scene (e.g. one or more surface regions into which one or more surfaces within the scene are divided). The radiosity data for each surface region within the scene may represent the radiosity of that surface region, for example the intensity of light transmitted through and/or emitted from and/or reflected by that surface region.

The radiosity data may be any desired and/or suitable radiosity data for the scene to the rendered. For example, the radiosity data may comprise light source radiosity data. The light source radiosity data may be derived from, or may be, the radiant intensity of light emitted from one or more light sources being used to light the scene.

The radiosity data may also or instead comprise surface radiosity data. The surface radiosity data may be derived by photon ray tracing from one or more light sources being used to light the scene towards one or more surfaces within the scene. Alternatively, the surface radiosity data may be derived by ray tracing from one or more surfaces within the scene towards one or more light sources being used to light the scene.

The surface radiosity data may also or instead be derived by considering or calculating the amount of light emitted and/or transmitted and/or reflected by each surface region, for example as a result of being lit by one or more other surface regions within the scene. The amount of light reflected may be determined based on reflectivity information for the surface region in question and/or previous radiosity data for each of the one or more other surface regions and/or surface interaction data for the surface region in question with respect to each of the one or more other surface regions. As will be discussed in more detail below, the surface interaction data may represent the potential for light interaction between the surface regions in question, for example based on the relative positions and/or orientations of those surface regions.

The radiosity data may be provided in any desired and suitable way. For example, the method may comprise generating, retrieving (e.g. from storage) and/or receiving the radiosity data for the scene. Similarly, the graphics processing system may comprise processing circuitry configured to generate, retrieve (e.g. from storage), and/or receive the radiosity data for the scene.

The radiosity data may be generated in any desired and suitable way. For example, generating the radiosity data for the scene may comprise casting one or more photon rays from one or more light sources for the scene towards one or more surfaces within the scene. Alternatively, generating the radiosity data for the scene may comprise casting one or more rays from one or more surfaces within the scene towards one or more light sources for the scene. The surface radiosity data may therefore comprise direct radiosity data generated by casting one or more direct rays onto or away from the one or more surfaces.

If desired, generating the radiosity data for the scene may further comprise casting one or more recursive photon rays from one or more of the surfaces (e.g. one or more specular surfaces and/or one or more diffuse surfaces) towards one or more other surfaces within the scene. The surface radiosity data may therefore also or instead comprise indirect radiosity data generated by casting one or more recursive photon rays from one or more (e.g. specular and/or diffuse) surfaces onto one or more other surfaces.

Generating the radiosity data for the scene may then comprise deriving the radiosity data at one or more surface regions or points (on the one or more surfaces and/or on the one or more other surfaces) that are intersected by the (direct and/or recursive) rays.

Generating the radiosity data for the scene may also or instead comprise considering or calculating the amount of light emitted and/or transmitted and/or reflected by each surface region, for example as a result of being lit by one or more other surface regions within the scene. As discussed above, the amount of light reflected may be determined based on reflectivity information for the surface region in question and/or previous radiosity data for each of the one or more other surface regions and/or surface interaction data for the surface region in question with respect to each of the one or more other surface regions. In these embodiments, the radiosity data for the scene may be generated iteratively in plural passes, with each subsequent pass using previous radiosity data generated in the previous pass. The iteration may be repeated for a selected or predetermined number of passes or may be repeated until a substantially steady radiosity state has been reached.

The one or more light sources for the scene may be any desired and suitable sources. For example, the one or more light sources for the scene may be selected from a group consisting of: point light sources, spotlight sources, directional light sources; and area light sources.

The properties (e.g. position, orientation, size, materials, radiant colour, radiant intensity, reflectivity, etc.) of the one or more surfaces and/or one or more light sources may be specified, e.g. in the scene geometry, for the scene.

Generating the radiosity data may further comprise sampling (e.g. point sampling) relatively higher resolution initial radiosity data for the scene and applying the sampled radiosity data to one or more corresponding relatively lower resolution surface regions. This can allow, for example, the radiosity data provided for the scene (which is later sampled in the final gather process) to be relatively lower in resolution than the radiosity data that may be initially provided (which may be used for purposes other than the final gather process). This can reduce the amount of resources (e.g. power, area, bandwidth, storage space, etc.) needed to process the radiosity data in the final gather process.

The radiosity data which is provided for the scene may be stored in any desired and suitable form. For example, the radiosity data may be stored in one or more light maps (textures) for the scene. The scene may, for example, comprise one or more lighting systems and there may be at least one light map for each of the one or more lighting systems. The one or more lighting systems may each comprise a group of light-interdependent surfaces and/or objects and/or geometry within the scene. The one or more lighting systems may each comprise an isolated and/or locally solvable lighting system, for example in respect of which the final gather process may be carried out in isolation and/or locally.

The resolution of the one or more surface regions for which the radiosity data is provided, and therefore the resolution of the light map(s), may be specified by one or more quality parameters.

The radiosity data may be generated from static scene geometry and/or dynamic scene geometry. In some embodiments, the radiosity data is generated (e.g. offline) from static scene geometry but not dynamic scene geometry. This can allow, for example, for the radiosity data to be generated in advance for the scene, i.e. before the application (e.g. game) that requires the scene runs, rather than in real-time. In some embodiments, other radiosity data may also be generated (e.g. in real-time) from dynamic scene geometry (when the scene has dynamic content). This other radiosity data may be generated in any desired and suitable way. As will be discussed below, this other radiosity data may be used to provide dynamic lighting effects. These embodiments can reduce the real-time processing burden placed on the graphics processing system but without significantly adversely affecting the quality of the lighting effects applied to scenes having dynamic content.

As discussed above, the technology described herein makes use of directional irradiance data provided for the scene. This directional irradiance data may comprise directional irradiance data provided in respect of one or more surface regions within the scene (e.g. the one or more surface regions into which the one or more surfaces within the scene are divided). The directional irradiance data for each surface region within the scene may represent (e.g. approximate or estimate) the irradiance (i.e. intensity of light received) at that surface region from each one of plural different contributing directions for that surface region.

Each of the one or more surface regions for which directional irradiance data is provided may comprise one or more of the final gather points. For example, each of the one or more surface regions may comprise a single one of the final gather points. However, in other embodiments, each of the one or more surface regions comprises plural of the final gather points. This can reduce the resources needed to process the directional irradiance data, without significantly affecting the quality of the final gather lighting data generated for the plural final gather points.

The directional irradiance data for a particular surface region may be defined with respect to a set of (predefined and/or discrete) contributing directions for that particular surface region. The set of contributing directions may be defined in terms of a solid angle from the particular surface region in question. The contributing directions within the set of contributing directions may be distributed, e.g. evenly, over a hemisphere or sphere for the surface region in question. There may, for example, be N contributing directions in the set of contributing directions, where N equals, or is at least, $2^n$ where n is a positive integer. Thus, N may be 2, 4, 8, 16, 32, 64, 128, 256, 512, 1024, 2048, etc.

The directional irradiance data may be provided in any desired and suitable way. For example, the method may comprise generating, retrieving (e.g. from storage) and/or receiving the directional irradiance data for the scene. Similarly, the graphics processing system may comprise processing circuitry configured to generate, retrieve (e.g. from storage), and/or receive the directional irradiance data for the scene.

The directional irradiance data may be generated in any desired and suitable way. For example, generating the directional irradiance data for a particular surface region may comprise considering the irradiance contribution from each one of the directions in the set of contributing directions for that particular surface region.

The directional irradiance data may be generated, at least in part, from surface interaction data for the scene. As discussed above, the surface interaction data may represent the potential for light interaction between surface regions within the scene. The surface interaction data may comprise one or more form factors for each of the one or more surface regions within the scene. Each form factor for a particular surface region may represent the potential for light interaction between that particular surface region and a particular other surface region within the scene. For example, each form factor for a particular surface region may represent the amount that the particular surface region can "see" the particular other surface region. Thus, for example, where a greater amount of a particular other surface region can be seen by a particular surface region, the form factor for that particular surface region relative to the particular other surface region may be larger. Conversely, where a lesser amount of a particular other surface region can be seen by a particular surface region, the form factor for the particular surface region relative to the particular other surface region may be smaller.

Each form factor may also or instead be based on the distance between the particular surface region and the particular other surface region. For example, where there is a greater distance between the particular surface region and the particular other surface region, the form factor may be smaller. Conversely, where there is a lesser distance between the particular surface region and the particular other surface region, the form factor may be greater.

The surface interaction data may be derived from the scene geometry for the scene, for example the surface profiles, surface orientations, surface material, and/or surface positions, etc. of the one or more surfaces. The surface interaction data may be generated from static scene geometry and/or dynamic scene geometry. However, in other embodiments, the surface interaction data may be generated (e.g. offline) from static scene geometry but not the dynamic scene geometry. This can allow, for example, for the surface interaction data to be generated in advance for the scene, i.e. before the application (e.g. game) that requires the scene runs, rather than in real-time. This can reduce the real-time processing burden placed on the graphics processing system but without significantly adversely affecting the quality of the lighting effects applied to scenes having dynamic content.

The directional irradiance data may also or instead be generated, at least in part, from radiosity data for the scene. For example, generating the directional irradiance for a particular surface region may comprise combining (e.g. multiplying) surface interaction data for that particular surface region (e.g. the form factor for that particular surface region) in respect of a particular other surface region and the radiosity data for that particular other surface region. This process may be carried out for the particular surface region in respect of each one of plural other surface regions within the scene, for example that are in a particular direction from the particular surface region. The results of these processes may then be combined (e.g. summed) to provide a directional irradiance value for that particular direction. This process may also be carried out for each other direction from the particular surface region so as to generate the directional irradiance data for the particular surface region. This process may also be carried out for each one of the one or more surface regions within the scene so as to generate the directional irradiance data for the one or more surface regions.

Again, the directional irradiance data may be generated from static radiosity data and/or dynamic radiosity data. However, in other embodiments, the directional irradiance data is generated (e.g. offline) from static radiosity data but not dynamic radiosity data. This can allow, for example, for the directional irradiance data to be generated in advance for the scene, i.e. before the application (e.g. game) that requires the scene runs, rather than in real-time. This can again reduce the real-time processing burden placed on the graphics processing system, without significantly adversely affecting the quality of the lighting effects applied to scenes having dynamic content.

The direction irradiance data may be stored in any desired and suitable form. For example, the directional irradiance data may be stored as one or more directional irradiance data textures for the scene. There may, for example, be at least one directional irradiance data texture for each lighting system for the scene. As discussed above, each lighting system may comprise a group of light-interdependent surfaces and/or objects and/or geometry within the scene. The one or more lighting systems may each comprise an isolated and/or locally solvable lighting system, for example in respect of which the final gather process may be carried out in isolation and/or locally.

The resolution of the one or more surface regions for which the directional irradiance data is provided, and therefore the resolution of the directional irradiance data texture(s), may be specified by one or more quality parameters. As will be appreciated from the above, the resolution of the directional irradiance data texture(s) may be the same as the resolution of the above-mentioned light map(s).

As discussed above, the technology described herein comprises performing a final gather process that comprises casting sampling rays from one or more final gather points within the scene. The sampling rays may be cast away from one or more surface regions for which directional irradiance data is provided and/or towards one or more surface regions for which radiosity data is provided.

As is indicated above, the one or more surface regions for which directional irradiance data is provided may have a relatively lower resolution than the resolution of the final gather points. For example, as discussed above, the one or more surface regions for which directional irradiance data is provided may each comprise plural of the final gather points. Similarly, the one or more surface regions for which radiosity data is provided may have a relatively lower resolution than the resolution of the final gather points. The relatively lower resolution for the one or more surface regions for which directional irradiance data and/or radiosity data is provided allows the amount of resources needed to process the directional irradiance data and/or radiosity data to be lower. However, the relatively higher resolution for the final gather points means that the quality of the final gather lighting data is less adversely affected and/or is not significantly adversely affected.

As discussed above, in the technology described herein the distribution of the sampling rays cast from the one or more of the final gather points is (e.g. selected) based on the directional irradiance data. The distribution of the sampling rays may be (e.g. selected) based on the directional irradiance data in any desired and suitable way.

In some embodiments, the distribution of sampling rays for a particular final gather point is selected by a look up into a directional irradiance data texture, e.g. to retrieve the relevant directional irradiance data for the particular surface region containing that particular final gather point. The look up process may comprise reading one or more directional irradiance data values in the directional irradiance data texture and/or may comprise interpolation, e.g. bilinear interpolation, using the directional irradiance data in the directional irradiance data texture.

In some embodiments, the distribution of sampling rays is derived by selecting one or more sampling directions, for example from a set of (predefined and/or discrete) sampling directions, in which to cast sampling rays based on the directional irradiance data. For example, one or more sampling directions from the set that are likely to contribute more irradiance at the particular surface region in question may be selected from the set. Conversely, one or more sampling directions in the set that are likely to contribute less irradiance at the particular surface region in question may be disregarded.

The distribution of sampling rays may also or instead be derived by applying weighting based on directional irradiance data. For example, a heavier weighting may be applied (and therefore more sampling rays may be cast) towards one or more sampling directions that are likely to contribute more irradiance. Conversely, a lighter or a zero weighting may be applied (and therefore fewer or zero sampling rays may be cast) towards one or more sampling directions that are likely to contribute less irradiance or that are likely to contribute no irradiance at the surface region in question. The weighting may be applied by one or more (e.g. overlapping) functions, such as one or more (e.g. overlapping) cosine lobes. The one or more weighting functions may be substantially centred on one or more (e.g. selected and/or predefined and/or discrete) sampling directions. The weighting may also or instead be applied by a function (e.g. a probability density function) that is used (e.g. in a Monte Carlo simulation) to generate the distribution of sampling rays.

The sampling directions that provide the distribution of sampling rays may include one or more of the above-mentioned contributing directions used to define and/or generate the directional irradiance data.

As will be appreciated, the distribution of sampling rays for a particular final gather point may be substantially non-uniform (e.g. when the directional irradiance data indicates that the surface region in question is unlikely to be uniformly lit) or may be substantially uniform (e.g. when the directional irradiance data indicates that the surface region in question is likely to be uniformly lit)—what matters in embodiments of the technology described herein is that the distribution of sampling rays for the particular final gather point is suitably (e.g. selected) based on the directional irradiance data.

As discussed above, the final gather process further comprises sampling the radiosity data for the scene using the sampling rays cast from the one or more final gather points. For example, the radiosity data for one or more surface regions may be sampled using the sampling rays that intersect those one or more surface regions. The sampling may comprise a look up into a light map, e.g. to retrieve the relevant radiosity data for the surface region that contains the intersected point. The look up may comprise reading one or more radiosity data values in the light map and/or may comprise interpolation, e.g. bilinear interpolation, using radiosity data in the light map.

The final gather process may also comprise casting further substantially uniformly (e.g. substantially evenly) distributed sampling rays from one or more of the one or more final gather points within the scene, and sampling the radiosity data for the scene using the further substantially uniformly (e.g. substantially evenly) distributed sampling rays cast from those final gather points. This can, for example, avoid overly biasing the final gather data with rays cast in a particular direction or particular directions.

The radiosity data sampled (e.g. for a particular final gather point and/or for the final gather points of a particular surface region) in the final gather process may then be combined, for example using (e.g. multiple) importance sampling, and/or collated to generate final gather lighting data (e.g. for the particular final gather point and/or for the particular surface region). The final gather lighting data for plural final gather points and/or plural surface regions may be combined and/or collated to generate final gather lighting data for the scene. The radiosity data sampled in the final gather process accordingly generates the final gather lighting data for the scene.

The final gather lighting data for the scene may then be outputted as output lighting data for the scene. However, the final gather lighting data for the scene may first be combined with other (e.g. higher resolution and/or dynamic) radiosity data provided for the scene to produce the output lighting data for the scene. This may further improve the quality of the output lighting data for the scene and/or apply dynamic lighting effects.

The radiosity data sampled in the final gather process may comprise static radiosity data and/or dynamic radiosity data. However, in other embodiments, the radiosity data sampled in the final gather process comprises static radiosity data but not dynamic radiosity data. Thus, the final gather process may be performed (entirely) offline. This can, for example, reduce the real-time processing burden placed on the graphics processing system. In these embodiments, dynamic lighting effects for the one or more surface regions may still be applied by combining the final gather lighting data for the scene with other (i.e. dynamic) radiosity data provided for the scene, as discussed above.

The output lighting data (e.g. final gather lighting data, or combined final gather and radiosity lighting data) may be used as desired. For example, the output lighting data may be used when rendering one or more primitives to generate output data values, e.g. for display. Thus, the technology described herein extends to a method or system for rendering one or more primitives to generate output data values, e.g. for display, that uses the output lighting data when rendering the one or more primitives.

For example, the output lighting data may be used to create (e.g. may be stored as) one or more lighting textures for the scene. The rendering process may then comprise using the one or more lighting textures when rendering one or more primitives. Using a lighting texture when rendering a primitive may comprise a look up into the lighting texture, e.g. to retrieve the relevant lighting data for the sampling position(s) at which the primitive is being sampled. The look up process may comprise reading one or more lighting data values in the lighting texture and/or may comprise interpolation, e.g. bilinear interpolation, using the lighting data in the lighting texture. The relevant lighting data may then be used to modify (lighten, darken and/or tint) the display (e.g. colour) values for the sampling position(s) at which the primitive is being sampled.

Alternatively, the rendering process may include modifying (lightening, darkening and/or tinting) vertex attribute (e.g. colour) data for the one or more primitives using the output lighting data.

As well as the processing stages discussed above, the graphics processing system may contain any suitable and desired graphics processing stages (e.g. stages of a graphics processing pipeline) that a graphics processing system may contain such as a vertex shader, a rasterisation stage, a rendering stage etc.

The vertex shader of the graphics processing pipeline may generate and/or modify (e.g. lighten, darken and/or tint) vertex attribute (e.g. colour) data for one or more primitives, for example using the output lighting data as discussed above.

The rasterisation stage of the graphics processing pipeline may generate graphics fragments to be rendered, for example to generate rendered graphics data for sampling points of a desired graphics output, such as a frame to be displayed. Each graphics fragment that is generated by the rasterisation stage may have associated with it a set of sampling points of the graphics output and may be used to generate rendered graphics data for one or more sampling points of the set of sampling points associated with the fragment. The rasterisation stage may be configured to generate the fragments for rendering in any desired and suitable manner. For example, the rasterisation stage may receive one or more primitives to be rasterised, test those one or more primitives against sets of sampling point positions, and generate fragments representing the primitives accordingly.

The rendering stage may process fragments generated by the rasterisation stage to generate rendered fragment data for (covered) sampling points that the fragments represent. The rendering process may include, for example, one or more of fragment shading, blending, texture-mapping, etc. The texture-mapping process may comprise using one or more lighting textures, for example in the manner discussed above. The rendering stage may be in the form of a programmable fragment shader.

The graphics processing pipeline may also contain any other suitable and desired processing stages that a graphics processing pipeline may contain such as an early depth (or an early depth and stencil) tester, a late depth (or depth and stencil) tester, a blender, etc.

As will be appreciated by those skilled in the art, the graphics processing system of the technology described herein may be part of an overall graphics processing system that includes, for example, a host processor. The host processor may, for example, execute applications that require graphics processing by the graphics processing system. The host processor may send appropriate commands and data to the graphics processing system to control it to perform graphics processing operations and to produce a graphics processing output required by applications executing on the host processor. To facilitate this, the host processor may execute a driver for the graphics processing system and/or may execute a compiler or compilers for compiling shader programs to be executed by a programmable execution unit of the graphics processing system.

The graphics processing system may also comprise, and/or be in communication with, one or more memories and/or memory devices that store the data described herein, and/or the output data generated by the graphics processing system, and/or store software for performing the processes described herein. The graphics processing system may also be in communication with a host microprocessor, and/or with a display for displaying images based on the data generated by the graphics processing system.

The technology described herein can be used for all forms of output that a graphics processing system may be used to generate, such as frames for display, render-to-texture outputs, etc. The output, e.g. fragment shaded, data values from the graphics processing may be exported to external, e.g. main, memory, for storage and use, such as to a frame buffer for a display.

The technology described herein is applicable to any suitable form or configuration of graphics processing systems, including tile-based graphics processing systems.

In an embodiment, the various functions of the technology described herein are carried out on a single graphics processing platform that generates and outputs the output lighting data and/or rendered data.

The technology described herein can be implemented in any suitable system, such as a suitably configured microprocessor based system. In an embodiment, the technology described herein is implemented in a computer and/or micro-processor based system.

The various functions of the technology described herein can be carried out in any desired and suitable manner. For example, the functions of the technology described herein can be implemented in hardware or software, as desired. Thus, for example, unless otherwise indicated, the various functional elements, stages, and "means" of the technology described herein may comprise a suitable processor or processors, controller or controllers, functional units, circuitry, processing logic, microprocessor arrangements, etc., that are operable to perform the various functions, etc., such as appropriately dedicated hardware elements and/or programmable hardware elements that can be programmed to operate in the desired manner.

It should also be noted here that, as will be appreciated by those skilled in the art, the various functions, etc., of the technology described herein may be duplicated and/or carried out in parallel on a given processor. Thus, for example, the processing circuitry may comprise plural separate functional units, operating in parallel. Equally, the various processing stages may share processing circuitry, etc., if desired.

Subject to any hardware necessary to carry out the specific functions discussed above, the graphics processing system can otherwise include any one or more or all of the usual functional units, etc., that graphics processing systems include.

The various graphics processing stages can accordingly be implemented as desired and in any suitable manner, and can perform any desired and suitable functions, respectively. Similarly, the various data (radiosity data, directional irradiance data, final gather lighting data, output lighting data, vertex attribute data etc.) can be defined and stored in any suitable and desired manner.

It will also be appreciated by those skilled in the art that all of the described embodiments of the technology described herein can, and in an embodiment do, include, as appropriate, any one or more or all of the optional features described herein.

The methods in accordance with the technology described herein may be implemented at least partially using software e.g. computer programs. Thus, further embodiments of the technology described herein comprise computer software specifically adapted to carry out the methods herein described when installed on a data processor, a computer program element comprising computer software code portions for performing the methods herein described when the program element is run on a data processor, and a computer program comprising code adapted to perform all the steps of a method or of the methods herein described when the program is run on a data processing system. The data processing system may be or may comprise a microprocessor system, a programmable FPGA (field programmable gate array), etc.

The technology described herein also extends to a computer software carrier comprising such software which when used to operate a graphics processor, renderer or microprocessor system comprising a data processor causes in conjunction with said data processor said graphics processor, renderer or system to carry out the steps of the methods of the technology described herein. Such a computer software carrier could be a physical storage medium such as a ROM chip, CD ROM, RAM, flash memory, or disk, or could be a signal such as an electronic signal over wires, an optical signal or a radio signal such as to a satellite or the like.

It will further be appreciated that not all steps of the methods of the technology described herein need be carried out by computer software and thus further embodiments of the technology described herein comprise computer software and such software installed on a computer software carrier for carrying out at least one of the steps of the methods set out herein.

The technology described herein may accordingly suitably be embodied as a computer program product for use with a computer system. Such an implementation may comprise a series of computer readable instructions either fixed on a tangible, non-transitory medium, such as a computer readable medium, for example, diskette, CD-ROM, ROM, RAM, flash memory, or hard disk. It could also comprise a series of computer readable instructions transmittable to a computer system, via a modem or other interface device, over either a tangible medium, including but not limited to optical or analogue communications lines, or intangibly using wireless techniques, including but not limited to microwave, infrared or other transmission techniques. The series of computer readable instructions embodies all or part of the functionality previously described herein.

Those skilled in the art will appreciate that such computer readable instructions can be written in a number of programming languages for use with many computer architectures or operating systems. Further, such instructions may be stored using any memory technology, present or future, including but not limited to, semiconductor, magnetic, or optical, or transmitted using any communications technology, present or future, including but not limited to optical, infrared, or microwave. It is contemplated that such a computer program product may be distributed as a removable medium with accompanying printed or electronic documentation, for example, shrink-wrapped software, preloaded with a computer system, for example, on a system ROM or fixed disk, or distributed from a server or electronic bulletin board over a network, for example, the Internet or World Wide Web.

As discussed above, the technology described herein relates to a graphics processing system that performs a final gather process for a scene to be rendered. Embodiments of the technology described herein will now be described with reference to a very simple scene. However, it will be appreciated that the technology described herein can be carried out in respect of much more complex scenes.

Figure 1:
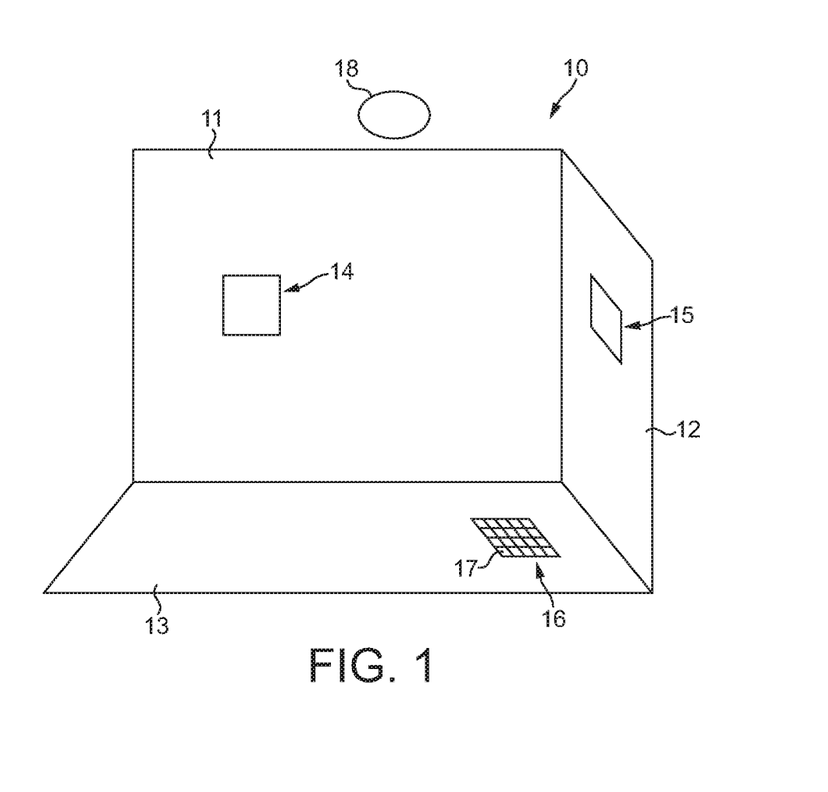
FIG. 1 illustrates a scene in respect of which a final gather process is to be performed in accordance with an embodiment of the technology described herein.

FIG. 1 shows a scene 10 in respect of which a final gather process is to be performed. The scene 10 comprises two wall surfaces 11, 12 and a floor surface 13. In order to carry out the final gather process, each of the three surfaces 11, 12, 13 is divided into plural surface regions, with each surface region being further divided into plural final gather points from which sampling rays are cast. For simplicity, only one surface region 14, 15, 16 for each of the three surfaces 11, 12, 13 is shown in FIG. 1. Similarly, for clarity, only the final gather points of the floor surface region 16 are shown and only one final gather point 17 is indicated in FIG. 1.

The final gather process will be described with particular reference being given to the floor surface region 16 and its light interaction with wall surface regions 14, 15. However, in practice, the final gather process for the floor surface region 16 is performed with consideration also being given to its light interaction with other surface regions within the scene 10. Also, in practice, the final gather process is performed for each surface region within the scene 10.

In this embodiment, there is a single spotlight source 18 for the scene 10, although in other embodiments there may be plural varied light sources.

Figure 2:
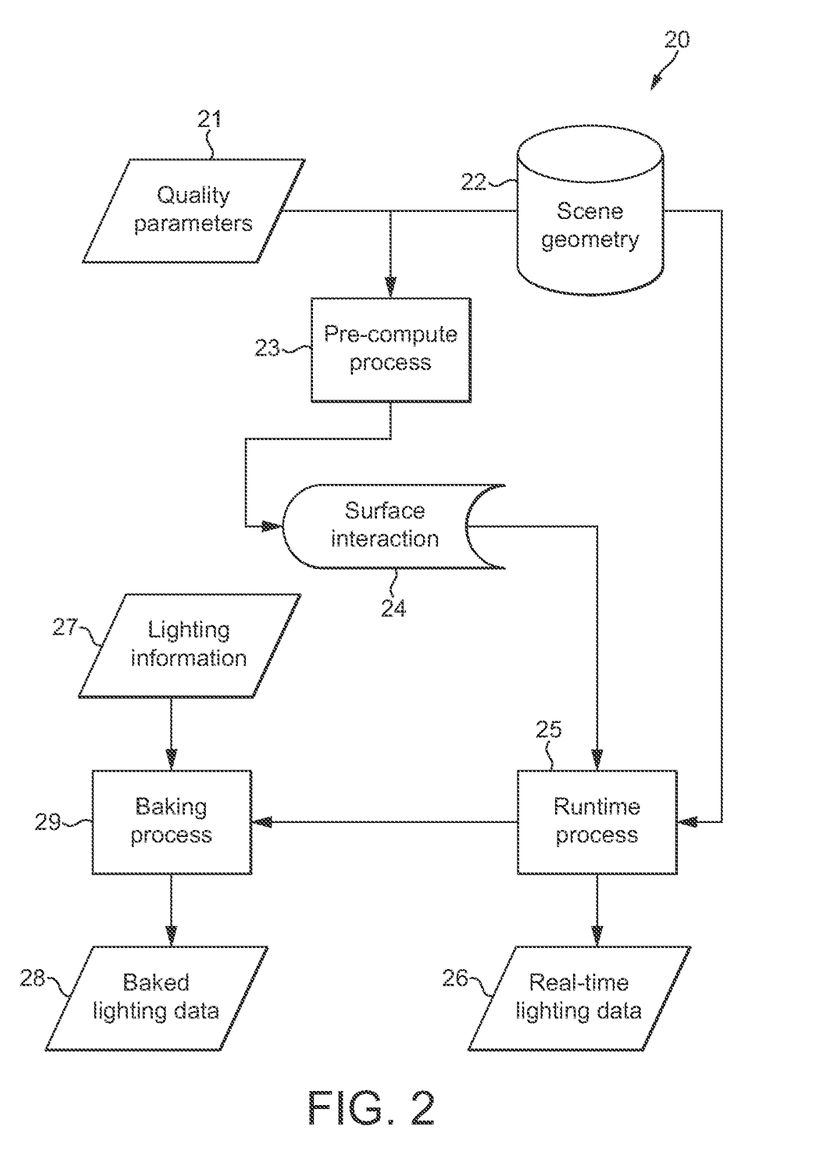
FIG. 2 shows schematically a lighting pipeline of a graphics processing system in accordance with an embodiment of the technology described herein.

The final gather process for the scene 10 will now be described in more detail with reference to FIG. 2, which shows a lighting pipeline 20 of a graphics processing system.

The lighting pipeline 20 comprises a sequence of different stages, which each perform a different operation so as to generate lighting data for the scene 10. FIG. 2 shows the main elements of a graphics processing system that are relevant to embodiments of the technology described herein. As will be appreciated by those skilled in the art there may be other elements of the graphics processing system that are not illustrated in FIG. 2. It should also be noted here that FIG. 2 is only schematic, and that, for example, in practice the shown elements may share significant hardware circuits, even though they are shown schematically as separate elements in FIG. 2.

The lighting pipeline 20 of the graphics processing system firstly comprises a pre-compute processing stage 23 that takes quality parameters 21 and scene geometry 22 as inputs and performs processes using those inputs. In this embodiment, the processes carried out by the pre-compute processing stage 23 are performed off-line using static scene geometry 22. This reduces the runtime processing burden placed on the graphics processing system.

The quality parameters 21 specify the resolution of the surface regions 14, 15, 16 in respect of which radiosity data and directional irradiance data for the scene 10 will be provided. The scene geometry 22 describes the properties of the surfaces 11, 12, 13 and light source 18 within the scene 10.

The pre-compute processing stage 23 takes the quality parameters 21 and scene geometry 22 and calculates surface interaction data 24 for the scene 10. The surface interaction data 24 calculated by the pre-compute processing stage 23 represents the potential for light interaction between the surfaces 11, 12, 13 of the scene 10. In this embodiment, the surface interaction data 24 comprises one or more form factors for each of the surface regions 14, 15, 16, with each form factor for a particular surface region (e.g. the floor surface region 16) representing the extent to which that surface region can "see" each of the other surface regions (e.g. wall surface region 14, wall surface region 15, etc.) within the scene 10. The form factors are also based on the distance between the surface regions 14, 15, 16 in question. In this embodiment, given the relative orientations and positions, the form factor for floor surface region 16 in respect of wall surface region 15 is greater than the form factor for floor surface region 16 in respect of wall surface region 14.

The lighting pipeline 20 of the graphics processing system also comprises a runtime stage 25 that takes the surface interaction data 24 and scene geometry 22 as inputs and performs processes using those inputs. In this embodiment, the following processes carried out by the runtime stage 25 are performed off-line using static scene geometry 22. Again, this reduces the runtime processing burden placed on the graphics processing system.

The runtime stage 25 firstly generates static radiosity data for the scene 10 using the static scene geometry 22. The radiosity data for the scene 10 represents the intensity of light emanating from the surfaces 11, 12, 13 of the scene 10 as a consequence of being lit by the light source 18. In this embodiment, the radiosity data is generated iteratively in several passes, with the first pass considering the amount of light transferred to the surface regions 14, 15, 16 from the light source 18 and with each subsequent pass considering the amount of light transferred between the surface regions 14, 15, 16 within the scene based on the form factors and reflectivity of the surface regions 14, 15, 16. The runtime stage 25 then stores the radiosity data for the surface regions 14, 15, 16 in a light map for the scene 10.

For simplicity, in the present embodiment only one such light map for the scene 10 is generated. However, in practice, the scene 10 will usually be divided into plural independent lighting systems, with a light map being generated for each system.

The runtime stage 25 also generates directional irradiance data for each surface region 14, 15, 16 within the scene. In this embodiment, the directional irradiance data for a particular surface region (e.g. floor surface region 16) approximates the intensity of light received at that surface region from each one of 256 different directions evenly distributed over a sphere at that surface region.

In this embodiment, generating the directional irradiance data for a particular surface region (e.g. floor surface region 16) from one of the directions comprises multiplying the form factor for that surface region in respect of a particular other surface region in that direction (e.g. wall surface region 14) by the radiosity of that particular other surface region. The result of this multiplication accordingly approximates the irradiance (i.e. amount of light that may be received) at the particular surface region (e.g. floor surface region 16) from that direction from that particular other surface region (e.g. wall surface region 14). This process is then repeated for each corresponding form factor and radiosity for each other surface region in that direction.

Similarly, generating the directional irradiance data for the particular surface region (e.g. floor surface region 16) from another one of the directions comprises multiplying the form factor for that surface region in respect of a particular other surface region in that other direction (e.g. wall surface region 15) by the radiosity of that particular other surface region. This process is then repeated for each corresponding form factor and radiosity for each other surface region in that other direction.

As will be appreciated, the above process is carried out for each corresponding form factor and radiosity in each one of the 256 contributing directions for the particular surface region (e.g. floor surface region 16) so as to generate the directional irradiance data for that particular surface region. A similar process is also carried out for each surface region within the scene 10 so as to generate directional irradiance data for the scene 10. The directional irradiance data for the scene 10 is then stored in a directional irradiance data texture for the scene 10.

Again, for simplicity, in the present embodiment only one directional irradiance data texture for the scene 10 is generated. However, in practice, the scene 10 will usually be divided into plural independent lighting systems, with a directional irradiance data texture being generated for each system.

Figure 3:
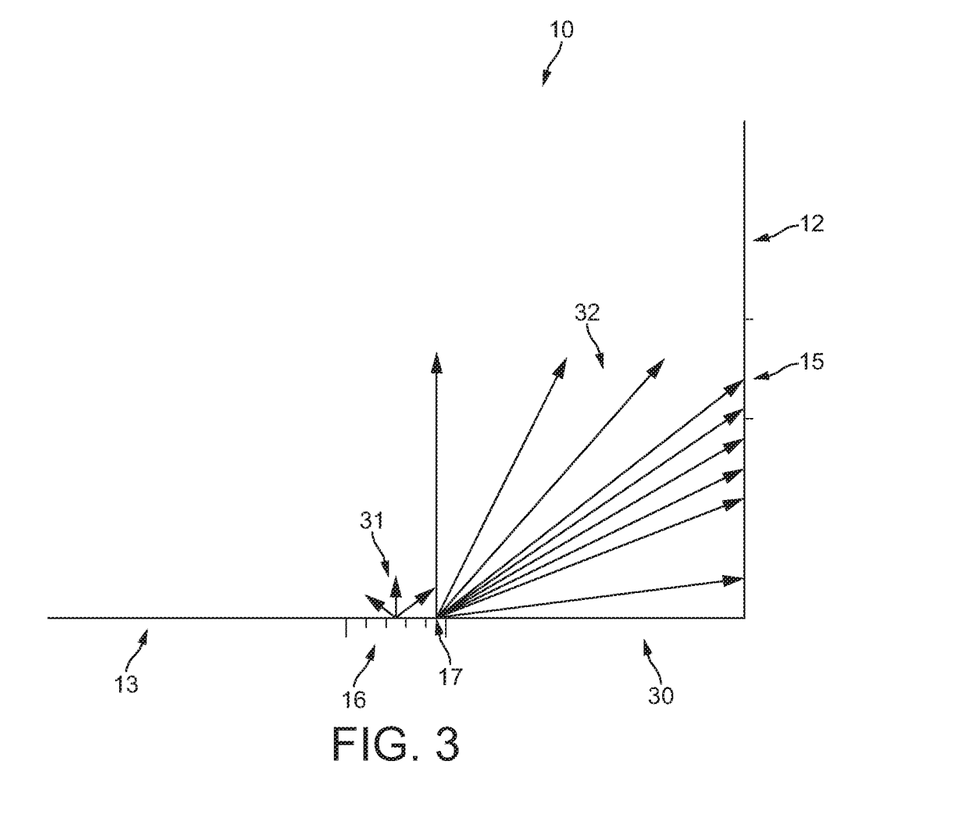
FIG. 3 graphically illustrates a method of casting sampling rays in a final gather process in accordance with an embodiment of the technology described herein.

The directional irradiance data 31 for floor surface region 16 is illustrated graphically in FIG. 3, which shows a cross-section 30 through the scene 10. For simplicity, in FIG. 3 the direction irradiance data 31 for only three of the 256 contributing directions is shown graphically using arrows. The longer arrows of the directional irradiance data 31 graphically represent contributing directions from which there is likely to be greater irradiance and the shorter arrows of the directional irradiance data 31 graphically represent contributing directions from which there is likely to be lesser irradiance. As can be seen from FIG. 3, the directional irradiance data 31 for the surface region 16 indicates that there is likely to be greater irradiance from the general direction of surface region 15 and lesser irradiance from other directions, including from the general direction of surface region 14.

In some embodiments, the desired output lighting data may contain static and dynamic content. In these embodiments, the runtime stage 25 may also generate dynamic radiosity data in real-time thereby providing real-time lighting data 26 for rendering the scene 10.

The lighting pipeline 20 of the graphics processing system also comprises a baking stage 29 that uses the static radiosity data in the light map and directional irradiance data in the directional irradiance data texture, and performs processes using that data. The baking stage 29 may also receive and make use of further, more complex, lighting information 27 relating to the properties of one or more light sources. In this embodiment, the following processes carried out by the baking stage 29 are performed off-line. Again, this reduces the runtime processing burden placed on the graphics processing system.

The baking stage 29 casts sampling rays from plural final gather points based on the directional irradiance data 31. For example, for the final gather point 17 of floor surface region 16, this involves a look up into the directional irradiance data texture to retrieve the directional irradiance data 31 for the floor surface region 16. It should be noted here that the same directional irradiance data 31 for the surface region 16 is used as a basis for distributing sampling rays from each of the final gather points within that surface region 16. This allows the directional irradiance data 31 to be generated and stored at the relatively lower resolution of the surface regions, whilst casting the sampling rays is performed at the relatively higher resolution of the final gather points. It has been found that this reduces the resources needed to process the directional irradiance data without significantly affecting the quality of the final gather lighting data.

FIG. 3 also graphically illustrates the distribution 32 of sampling rays for the final gather point 17 for the surface region 16. As is shown in FIG. 3, based on the directional irradiance data, more sampling rays 31 are selected for casting in the general direction of surface region 15, fewer sampling rays are selected for casting in other selected directions, and no sampling rays are selected for casting in yet other directions, including in the general direction of surface region 14.

The baking stage 29 then samples the radiosity data for the scene 10 using the sampling rays that are cast for the final gather point 17. This involves a look up into the light map for the scene 10 for the radiosity data for the surface regions (e.g. wall surface region 15) at which the sampling rays intersect the surfaces (e.g. wall surface 12) of the scene 10. It should again be noted here that the radiosity data in the light map that is sampled by the sampling rays is relatively lower resolution than the resolution of the final gather points. This again reduces the resources needed when performing the final gather process without significantly affecting the quality of the final gather lighting data.

The sampled radiosity data for each final gather point (e.g. final gather point 17) is then combined using multiple importance sampling to generate final gather lighting data for that final gather point. As will be appreciated, the processes of casting sampling rays based on directional irradiance data (e.g. directional irradiance data 31) for a surface region (e.g. floor surface region 16), sampling radiosity data, and combining the sampled radiosity data is carried out in respect of each final gather point for that surface region to generate final gather lighting data for that surface region. As will also be appreciated, the process of generating final gather lighting data based on the directional irradiance data for the scene 10 is carried out in respect of each final gather point for each surface region of the scene so as to generate final gather lighting data for the scene 10.

The final gather lighting data for the scene 10 may then be output from the baking stage 29 as baked lighting data 28.

As discussed above, in some embodiments, the desired output lighting data may contain static and dynamic content. In these embodiments, the baked lighting data 28 may be combined with the real-time lighting data 26 to generate the output lighting data for rendering the scene 10. However, in other embodiments, the desired output lighting data may contain only static content. In these embodiments, the output lighting data for the scene 10 may be the baked lighting data 28. In either case, the output lighting data is stored as a lighting texture and can then be used to render the scene 10.

Figure 4:
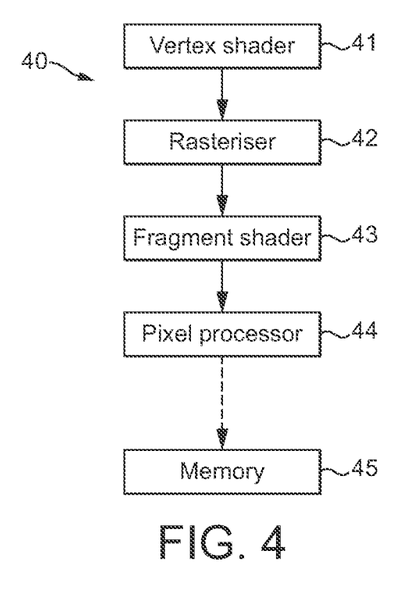
FIG. 4 shows schematically a rendering pipeline and a memory of a graphics processing system in accordance with an embodiment of the technology described herein.

The rendering process will now be described in more detail with reference to FIG. 4, which illustrates a rendering pipeline 40 and a memory 45 of the graphics processing system.

The pipeline 40 comprises a sequence of different stages, which each perform a different operation on the primitives making up the object to be displayed to prepare them for the render output, e.g. for display. FIG. 4 shows further elements of a graphics processing system that are relevant to embodiments of the technology described herein. As will be appreciated by those skilled in the art there may be other elements of the graphics processing system that are not illustrated in FIG. 4. It should also be noted here that FIG. 4 is only schematic, and that, for example, in practice the shown functional units and rendering pipeline stages may share significant hardware circuits, even though they are shown schematically as separate stages in FIG. 4.

First in the pipeline 40 is a vertex shader 41 which vertex shades the vertices for the output being generated. The vertex shader 41 takes the input data values associated with the vertices, etc., defined for the output to be generated, and processes those data values to generate a set of corresponding vertex shaded attribute data values for use by subsequent stages of the rendering pipeline 40.

The rasteriser 42 then operates to rasterise the primitives making up the render output into individual graphics fragments for processing. To do this, the rasteriser 42 receives graphics primitives for rendering, rasterises the primitives to sampling points and generates graphics fragments representing appropriate sampling positions for rendering the primitives. The fragments generated by the rasteriser 42 are then sent onwards to the rest of the pipeline for processing.

The graphics fragments generated by the rasteriser 42 are passed to the fragment shader 43 for shading. As part of the shading process, the fragment shader 43 determines lighting texture coordinates for the sampling positions of the graphics fragments, performs a look up into the lighting texture using those texture coordinates, and uses the looked-up lighting texture values to modify the display, e.g. colour, values for those sampling positions. The output of the fragment shader 43 is then a set of appropriately lit, e.g. colour, values for sampling positions representing each surface region of the output in question.

The shaded sampling positions from the fragment shader 43 are then processed by a pixel processor 44 to post-process, e.g. down-sample, the rendered sampling positions to provide pixel data for the pixels that will actually be output. The pixel data may then be output, for example to main memory 45 (e.g. a frame buffer), for example for display.

Other arrangements for the rendering pipeline 40 would, of course, be possible. For example, rather than the fragment shader 43 applying lighting effects, the vertex shader 41 may modify its input data to take account of the effect of lighting in the image to be rendered. This may, for example, comprise the vertex shader 41 modifying its input data using the output lighting data described above.

It can be seen from the above that the technology described herein, in some embodiments at least, provides a graphics processing system that can generate final gather lighting data in a more efficient manner. This is achieved, in some embodiments at least, by basing the distribution of the sampling rays cast from the final gather points on directional irradiance data provided for the scene.

The foregoing detailed description has been presented for the purposes of illustration and description. It is not intended to be exhaustive or to limit the technology to the precise form disclosed. Many modifications and variations are possible in the light of the above teaching. The described embodiments were chosen in order to best explain the principles of the technology and its practical application, to thereby enable others skilled in the art to best utilise the technology in various embodiments and with various modifications as are suited to the particular use contemplated. It is intended that the scope be defined by the claims appended hereto.

What is claimed is:

1. A method of operating a graphics processing system comprising:
   for each of one or more surface regions of a plurality of surface regions of a scene to be rendered:
      determining one or more form factors for the surface region based on both a position and orientation of the surface region relative to one or more other surface regions, wherein the one or more form factors represent a potential for light interaction between the surface region and the one or more other surface regions; and
      generating directional irradiance data for the surface region of the scene to be rendered using the one or more form factors for that surface region, the directional irradiance data for the surface region representing the irradiance at the surface region from each one of plural different irradiance contributing directions for the surface region;
   the method further comprising:
   performing a final gather process so as to generate final gather lighting data for the scene to be rendered, the final gather process comprising:
      using the directional irradiance data generated for the one or more surface regions to select a distribution of sampling rays to cast from one or more final gather points within the scene, the selecting comprising selecting at least one of: one or more sampling directions in which to cast sampling rays, and the number of sampling rays to cast in a sampling direction;
      casting sampling rays from the one or more final gather points within the scene in the distribution selected using the directional irradiance data provided for the scene;
      sampling radiosity data provided for the scene using the sampling rays cast from the one or more final gather points; and
      generating the final gather lighting data from the sampled radiosity data; and
   outputting lighting data that comprises or is derived from the final gather lighting data for use when rendering one or more primitives to generate output data values.

2. A method as claimed in claim 1, comprising generating the directional irradiance data, at least in part, from surface interaction data for the scene.

3. A method as claimed in claim 2, comprising generating the surface interaction data from static scene geometry but not dynamic scene geometry.

4. A method as claimed in claim 1, comprising generating the directional irradiance data, at least in part, from radiosity data for the scene.

5. A method as claimed in claim 1, wherein generating the directional irradiance data for a particular surface region within the scene comprises combining: i) surface interaction data for the particular surface region in respect of a particular other surface region within the scene; and ii) radiosity data for the particular other surface region.

6. A method as claimed in claim 1, wherein the directional irradiance data is stored as a directional irradiance data texture for the scene.

7. A method as claimed in claim 1, comprising:
   casting relatively more sampling rays in one or more particular directions when the directional irradiance data indicates that those one or more particular directions are likely to provide a relatively greater amount irradiance; or casting relatively fewer or no sampling rays in one or more other particular directions when the directional irradiance data indicates that those one or more other particular directions are likely to provide a relatively lesser amount of irradiance.

8. A method as claimed in claim 1, comprising:

casting further sampling rays from the one or more final gather points, wherein the distribution of the further sampling rays cast from the one or more final gather points is substantially uniform.

9. A graphics processing system comprising:

a directional irradiance data generating circuit configured to, for each of one or more surface regions of a scene to be rendered:

determine one or more form factors for the surface region based on both a position and orientation of the surface region relative to one or more other surface regions, wherein the one or more form factors represent a potential for light interaction between the surface region and the one or more other surface regions; and generate directional irradiance data for the surface region of the scene to be rendered using the one or more form factors for that surface region, the directional irradiance data for the surface region representing the irradiance at the surface region from each one of plural different irradiance contributing directions for the surface region; and a final gather processing circuit configured to perform a final gather process so as to generate final gather lighting data for the scene to be rendered, the final gather processing circuit being configured to:

use the directional irradiance data generated for the one or more surface regions to select a distribution of sampling rays to cast from one or more final gather points within the scene, the selecting comprising selecting at least one of: one or more sampling directions in which to cast sampling rays, and the number of sampling rays to cast in a sampling direction;

cast sampling rays from the one or more final gather points within the scene, in the distribution selected using the directional irradiance data provided for the scene;

sample radiosity data provided for the scene using the sampling rays cast from the one or more final gather points; and generate the final gather lighting data from the sampled radiosity data; and output lighting data that comprises or is derived from the final gather lighting data for use when rendering one or more primitives to generate output data values.

10. A system as claimed in claim 9, wherein the directional irradiance data generating circuit is configured to generate the directional irradiance data, at least in part, from surface interaction data for the scene.

11. A system as claimed in claim 10, wherein the directional irradiance data generating circuit is configured to generate the surface interaction data from static scene geometry but not dynamic scene geometry.

12. A system as claimed in claim 9, wherein the directional irradiance data generating circuit is configured to generate the directional irradiance data, at least in part, from radiosity data for the scene.

13. A system as claimed in claim 9, wherein generating the directional irradiance data for a particular surface region within the scene comprises combining: i) surface interaction data for the particular surface region in respect of a particular other surface region within the scene; and ii) radiosity data for the particular other surface region.

14. A system as claimed in claim 9, wherein the directional irradiance data is stored as a directional irradiance data texture for the scene.

15. A system as claimed in claim 9, wherein the final gather processing circuit is configured to:

cast relatively more sampling rays in one or more particular directions when the directional irradiance data indicates that those one or more particular directions are likely to provide a relatively greater amount irradiance; or cast relatively fewer or no sampling rays in one or more other particular directions when the directional irradiance data indicates that those one or more other particular directions are likely to provide a relatively lesser amount of irradiance.

16. A system as claimed in claim 9, wherein the final gather processing circuit is configured to:

cast further sampling rays from the one or more final gather points, wherein the distribution of the further sampling rays cast from the one or more final gather points is substantially uniform.

17. A non-transitory computer readable storage medium storing computer software code which when executing on a processor of a graphics processing system performs a method comprising:

for each of one or more surface regions of a scene to be rendered:

determining one or more form factors for the surface region based on both a position and orientation of the surface region relative to one or more other surface regions, wherein the one or more form factors represent a potential for light interaction between the surface region and the one or more other surface regions; and generating directional irradiance data for the one or more surface regions of the scene to be rendered using the one or more form factors for that surface region, the directional irradiance data for the surface region representing the irradiance at the surface region from each one of plural different irradiance contributing directions for the surface region;

the method further comprising:

performing a final gather process so as to generate final gather lighting data for the scene to be rendered, the final gather process comprising:

using the directional irradiance data generated for the one or more surface regions to select a distribution of sampling rays to cast from one or more final gather points within the scene, the selecting comprising selecting at least one of: one or more sampling directions in which to cast sampling rays, and the number of sampling rays to cast in a sampling direction;

casting sampling rays from the one or more final gather points within the scene in the distribution selected using the directional irradiance data provided for the scene;

sampling radiosity data provided for the scene using the sampling rays cast from the one or more final gather points; and generating the final gather lighting data from the sampled radiosity data; and outputting lighting data that comprises or is derived from the final gather lighting data for use when rendering one or more primitives to generate output data values.

\* \* \* \* \*